United States Patent [19]

Iwatani

[11] Patent Number: 5,184,060
[45] Date of Patent: Feb. 2, 1993

[54] CONTROL APPARATUS FOR AN AC GENERATOR

[75] Inventor: Shiro Iwatani, Himeji, Japan

[73] Assignee: Mitsubishi Denki Kabushiki Kaisha, Tokyo, Japan

[21] Appl. No.: 709,845

[22] Filed: Jun. 4, 1991

[30] Foreign Application Priority Data

Jun. 18, 1990 [JP] Japan .................. 2-157480

[51] Int. Cl.⁵ .............. H02K 11/00; H02H 7/06
[52] U.S. Cl. ........................ 322/99; 322/28
[58] Field of Search ........ 322/72, 73, 28, 99; 320/64

[56] References Cited

U.S. PATENT DOCUMENTS

| | | | |
|---|---|---|---|
| 3,376,497 | 4/1968 | Lund | 322/28 |
| 4,349,854 | 9/1982 | Mori et al. | 322/28 X |
| 4,471,288 | 9/1984 | Morishita et al. | 322/99 |
| 4,755,737 | 7/1988 | Komurasaki et al. | 322/99 |
| 4,812,732 | 3/1989 | Iwatani | 322/99 |

FOREIGN PATENT DOCUMENTS 1209197 1/1966 Fed. Rep. of Germany .
1192921 5/1970 United Kingdom .

Primary Examiner—Steven L. Stephan
Assistant Examiner—E. To
Attorney, Agent, or Firm—Sughrue, Mion, Zinn, Macpeak and Seas

[57] ABSTRACT

A control apparatus for an AC generator in which a storage battery 4 is connected to the field coil 102 of the generator, and through a rectifier 2 to the armature coil 101 of the generator to be charged thereby. A voltage regulator 3 is connected between the generator and the battery for controlling the current supply to the field coil, and includes a switch 306 connected in series with the field coil for turning the current supply on and off to control the output voltage of the generator. A detector 6A or 6B is connected between the armature coil and the battery and between the rectifier and the battery for detecting the operating state of the generator and attendantly operating an indicator 7. The detector includes a switch 605, 607 for turning the indicator on and off, an emitter follower transistor 610 connected through the rectifier to the armature coil for controlling the switch based on the generation signal, and a relatively small capacitor 603 connected to the transistor for smoothing the generation signal. An adjuster 310, 311 may be connected between the voltage regulator and the detector for detecting the output voltage of the transistor and reducing the generation signal to a value lower than that to which it is normally controlled by the voltage regulator.

4 Claims, 3 Drawing Sheets

CONTROL APPARATUS FOR AN AC GENERATOR

BACKGROUND OF THE INVENTION

The present invention relates to a control apparatus for an AC generator, and more particularly, to a control apparatus for a vehicular AC generator in which the required capacitance of a smoothing capacitor, which serves to smooth a generation signal provided by the generator for controlling an indicator connected through a power generation detector and a rectifier to the armature coil of the generator, can be reduced, and in which a storage battery for supplying a current to the field coil of the generator through the rectifier is made difficult to discharge through the rectifier and the power generation detector when diodes as used in a rectifier are deteriorated for some reason.

A typical example of an AC generator having a known control apparatus is illustrated in FIG. 3. In this figure, an AC generator in the form of a vehicular AC generator, generally designated by reference numeral 1, includes an armature coil 101 in the form of a three-phase armature coil comprising three coil elements arranged in a star-like manner and connected at their one end to each other, and a field coil 102.

A rectifier in the form of a full-wave rectifier, generally designated by reference numeral 2, is connected to the armature coil 1 for rectifying the outputs thereof. The full-wave recifier 2 has an output terminal 201, a ground terminal 202 connected to ground, and three input terminals 203 each connected to the other end of a corresponding coil element of the armature coil 1. The full-wave rectifier 2 also includes three pairs of rectifying diodes, each pair comprising two diodes serially connected to each other at a junction or input terminal 203. The three pairs of serially connected diodes are connected in a parallel relation with each other at their opposite ends to the common output terminal 201 and the ground terminal 202, respectively.

A voltage regulator, generally designated by reference numeral 3, is connected to the field coil 102 of the AC generator 1 and to the output terminal 201 of the rectifier 2. The voltage regulator 3 includes a pair of voltage dividing resistors 301, 302 serially connected to each other between the output terminal 201 of the rectifier 2 and ground, a Zener diode 303 having a cathode connected to a junction between the resistors 301, 302, a control transistor 304 having a base connected to an anode of the Zener diode 303 and an emitter connected to ground, a base-current supplying resistor 305 having one end thereof connected to a collector of the transistor 304, a switch 306 in the form of a power transistor having a base connected to a junction between the collector of the control transistor 304 and the base-current supplying resistor 305, an emitter connected to ground and a collector connected to the output terminal 201 of the rectifier 2 through the field coil 102 of the AC generator 1, and a suppression diode 307 having a cathode connected to the collector of the power transistor 306 and an anode connected to the output terminal 201 of the rectifier 2.

A storage battery 4 is connected between the output terminal 201 of the rectifier 2 and ground. The storage battery 4 is also connected at a positive terminal or electrode thereof through a key switch 5 to the other end of the base-current supplying resistor 305 of the voltage regulator 3 and directly to one end of the voltage dividing resistor 301.

A power generation detector 6 is connected between the key switch 5 and the AC generator 1, and between the key switch 5 and the voltage regulator 3 for detecting the operating state or power generation of the AC generator 1. The detector 6 comprises a smoothing resistor 601 having one end thereof connected to one of the input terminals of the rectifier 2 or one end of one of the coil elements of the armature coil 101, a reverse-current checking diode 602 having an anode connected to the other end of the smoothing resistor 601, a smoothing capacitor 603 connected between a cathode of the reverse-current checking diode 602 and ground, a smoothing resistor 604 having one end thereof connected to the cathode of the reverse-current checking diode 602, a control transistor 605 having a base connected to the other end of the smoothing resistor 604 and an emitter connected to ground, a base-current supplying resistor 606 connected between a collector of the control transistor 605 and the key switch 5, and a detector switch 607 in the form of a power transistor having a base connected to a collector of the control transistor 605 and an emitter connected to ground.

An indicator 7 in the form of an indicator lamp is connected between the power transistor 607 and the key switch 5.

In the above description, the rectifier 2, the voltage regulator 3, the storage battery 4, the key switch 5, the power generation controller 6 and the indicator lamp 7 together constitute a known control apparatus.

In operation, when the key switch 5 is first turned on, the AC generator 1 is still held inoperative or does not generate electric power. Thus, at this time, the generator 1 does not supply a generation signal in the form of a current to the power generation detector 6, so the control transistor 605 is held non-conductive. On the other hand, with the turning on of the key switch 5, a current is supplied from the storage battery 4 through the base-current supplying resistor 606 to the power transistor 607 which is thereby made conductive, turning the indicator lamp 7 on. As a result, it is indicated that the generator 1 generates no electric power.

Also, at the time of the key switch 5 being turned on, the storage battery 4 does not have a high voltage sufficient to make the Zener diode 303 conductive, so the control transistor 304 is non-conductive or turned off. Thus, at this time, a current begins to flow from the storage battery 4 to the base of the power transistor 306 through the key switch 5 and the base-current supplying resistor 305, making the power transistor 306 conductive. As a result, a current is supplied from the storage battery 4 through the now conductive power transistor 306 to the field coil 102 of the AC generator 1 to energize it. Subsequently, when an unillustrated engine is started under this condition, the AC generator 1 is driven to rotate by the engine so that it begins to generate electric power and a generation signal in the form of a current. The current thus generated by the generator 1 is supplied from the armature coil 101 to the power generation detector 6, whereby the control transistor 605 of the detector 6 is made conductive, turning the power transistor 607 off. As a result, the indicator lamp 7 is also turned off, thus indicating the start of power generation of the generator 1.

However, as long as the output power of the AC generator 1 is less than a predetermined value, both the Zener diode 303 and the control transistor 304 remain non-conductive, so the power transistor 306 continues to be held conductive. Accordingly, the field current supplied from the battery 4 to the field coil 102 increases, raising the output voltage of the AC generator 1. When the generator output voltage exceeds the predetermined value, the Zener diode 303 becomes conductive so that a current is supplied from the battery 4 to the base of the control transistor 304 through the now conductive Zener diode 303. As a result, the control transistor 304 is turned on so that the current supply from the battery 4 to the base of the power transistor 306 is stopped, thus turning it off. Consequently, the current supply to the field coil 102 decreases to reduce the output power of the generator 1. With a repetition of the above operations, the output voltage of the generator 1 is regulated to the predetermined value under the action of the voltage regulator 3.

With the known control apparatus as constructed above, the generation signal output from the armature coil 101 contains an AC component, which is required to be smoothed. In this case, since the generation signal from the generator 1, after being smoothed, is input to the emitter-grounded control transistor 605, it is necessary to increase the capacitance of the smoothing capacitor 603 in order to increase the smoothing effect or a CR time constant. This unnecessarily results in an increase in the manufacturing cost.

In addition, the relatively low input impedance of the power generation detector 6 for the generation signal requires an accordingly low resistance of the smoothing resistor 601. Accordingly, in the event that there occurs a current leakage due to the deterioration of any of the diodes of the rectifier 2 at the side of the output terminal 201 thereof, a relatively large current flows from the storage battery 4 to ground by way of the deteriorated diode of the rectifier 2, the smoothing resistor 601, the reverse-current checking diode 602, the smoothing resistor 604 and the base-emitter of the control transistor 605 even during the inoperative condition of the AC generator 1, i.e., when the key switch 5 is turned off. Thus, the storage battery 4 is easy to discharge through the detector 6 upon a failure in the rectifier 2.

Moreover, when the storage battery 4 is fully charged by a continued operation of the generator 1 and held, for an extended period of time, at a voltage level which is higher than the predetermined value to which the voltage regulator regulates the output voltage of the generator 1 (this is called "a floating phenomenon" of the storage battery 4), the control transistor 304 is continuously conductive to hold the power transistor 306 non-conductive with the result that the voltage level of the generation signal from the generator 1 gradually falls or decreases. When the generation signal falls below a prescribed level, the control transistor 605 becomes non-conductive whereby the power transistor 607 is turned on. As a result, the indicator lamp 7 is lighted, incorrectly indicating that the generator 1 is out of operation.

SUMMARY OF THE INVENTION

Accordingly, the present invention is intended to overcome the above-described problems encountered with the known control apparatus.

An object of the invention is to provide a novel and improved control apparatus for an AC generator in which the capacitance of a smoothing capacitor as required can be reduced.

Another object of the invention is to provide a novel and improved control apparatus for an AC generator in which even if any diode in a rectifier is deteriorated, a storage battery can be prevented from discharging through the deteriorated diode.

A further object of the invention is to provide a novel and improved control apparatus for an AC generator which is able to adjust a generation signal output by the generator even if a so-called floating phenomenon of the storage battery takes place.

In order to achieve the above objects, according to the present invention, there is provided a control apparatus for an AC generator having a field coil and an armature coil which provides a generation signal during power generation of the generator. The control apparatus comprises: a rectifier connected to the generator for rectifying the output voltage thereof; a storage battery connected to the field coil of the generator for supplying a current to the field coil, the battery being also connected through the rectifier to the armature coil of the generator so as to be charged by the generator through the rectifier; a voltage regulator connected between the generator and the battery for controlling the current supply from the battery to the field coil, the voltage regulator including a switch connected in series with the field coil of the generator for turning on and off the current supply from the storage battery to the field coil so as to control the output voltage of the generator to a predetermined value; and a detector connected between the armature coil of the generator and the storage battery and between the rectifier and the storage battery for detecting the operating state of the generator and operating an indicator so as to indicate the detected operating state of the generator.

The detector comprises: an indicator switch for turning the indicator on and off; an emitter follower transistor connected through the rectifier to the armature coil of the generator for switching over the indicator switch based on the generation signal from the armature coil; and a capacitor connected to the emitter follower transistor for smoothing the generation signal from the armature coil.

Preferably, the indicator switch comprises: a power transistor which has a collector connected through the indicator to the storage battery, an emitter connected to ground and a base connected through a resistor to the storage battery; and a control transistor which has a collector connected to the base of the power transistor, an emitter connected to ground and a base connected through a resistor to an emitter of the emitter follower transistor, the emitter follower transistor having a collector connected to the storage battery and a base connected through a reverse-current checking diode and a resistor to the rectifier.

In a preferred embodiment, adjusting means is connected between the voltage regulator and the detector for detecting the output voltage of the emitter follower transistor and adjusting it to a value lower than the predetermined value to which the output voltage of the generator is controlled by the voltage regulator.

Preferably, the voltage regulator comprises: a power transistor which has a collector connected through the field coil of the generator to the storage battery, an emitter connected to ground and a base connected through a resistor to the storage battery; a first control transistor which has a collector connected to the base of the power transistor, an emitter and a base connected through a first Zener diode to a voltage divider which is connected between the storage battery and ground; and a second control transistor which has a collector connected to the emitter of the first control transistor, an emitter connected to ground and a base connected through a second Zener diode and a resistor to the emitter of the emitter follower transistor. The second Zener diode has a threshold voltage which is lower than that of the first Zener diode.

The above and other objects, features and advantages of the present invention will now become more readily apparent from the following detailed description of a few preferred embodiments of the invention taken in conjunction with the accompanying drawings.

BRIEF DESCRIPTION OF THE DRAWINGS

In the drawings, the same or corresponding parts are identified by the same symbols.

DESCRIPTION OF THE PREFERRED EMBODIMENTS

A few preferred embodiments of the present invention will now be described in detail while referring to the accompanying drawings.

Figure 1:
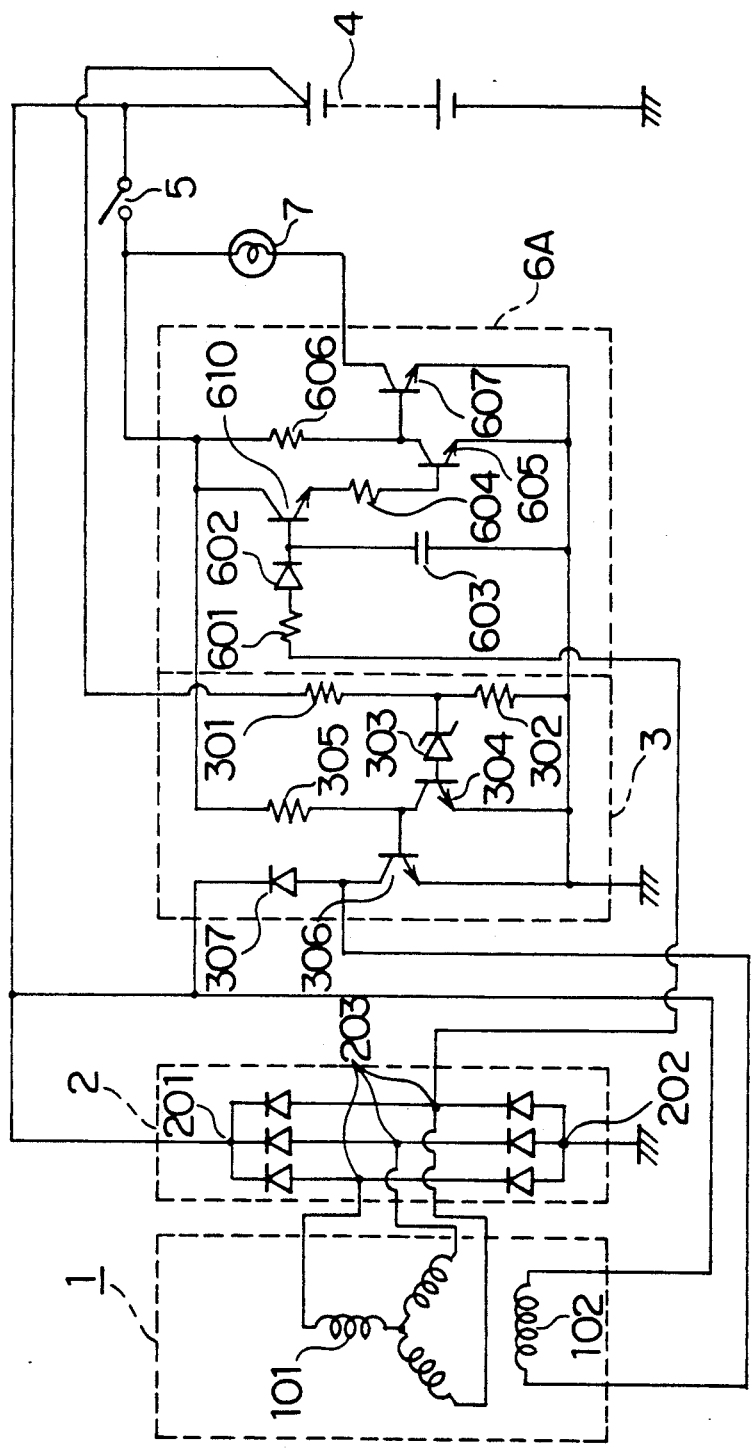
FIG. 1 is a circuit diagram of a control apparatus for an AC generator in accordance with a first embodiment of the invention.

FIG. 1 shows an AC generator 1 equipped with a control apparatus which is constructed in accordance with a first embodiment of the present invention. The AC generator 1 is in the form of a three-phase AC generator having an armature coil 101 and a field coil 102, as in the generator 1 of FIG. 3. The control apparatus of the invention includes a rectifier 2 in the form of a full-wave rectifier, a storage battery 4, a key switch 5, and an indicator 7 in the form of an indicator lamp, all of which are similar in construction and operation to the corresponding elements 1, 2, 4, 5 and 7 of the aforementioned known control apparatus of FIG. 3. In addition to these elements, the control apparatus of the invention includes a power generation detector 6A which is different in construction and operation from the detector 6 of FIG. 3.

Specifically, the detector 6A of the invention is constructed as follows. It includes an emitter follower transistor 610 in addition to resistors 601, 604 and 606, a reverse-current checking diode 602, a capacitor 603, and a pair of transistors 605, 607, all of which are connected substantially in the same manner as those of FIG. 3. The transistor 610 has a collector connected to a junction between the base-current supplying resistor 606 and the indicator lamp 7, an emitter connected to one end of the smoothing resistor 604, and a base connected to a cathode of the reverse-current checking diode 602.

In operation, when the key switch 5 is switched on, the emitter follower transistor 610 and the control transistor 605 both remain non-conductive, so the power transistor 607 becomes conductive, turning the indicator lamp 7 on indicating that the generator 1 is out of operation or generates no power.

Subsequently, when the unillustrated engine is started to drive the generator 1, the generator 1 begins to generate electric power and a generation signal in the form of a current which is supplied through the rectifier 2, the smoothing resistor 601 and the reverse-current checking diode 602 to the base of the transistor 610 and the smoothing capacitor 603. When the capacitor 603 is charged by the current from the generator 1, the transistor 610 becomes conductive, thus making the control transistor 605 conductive. As a result, the power transistor 607 is made non-conductive, thus turning the indicator lamp 7 off.

Figure 3:
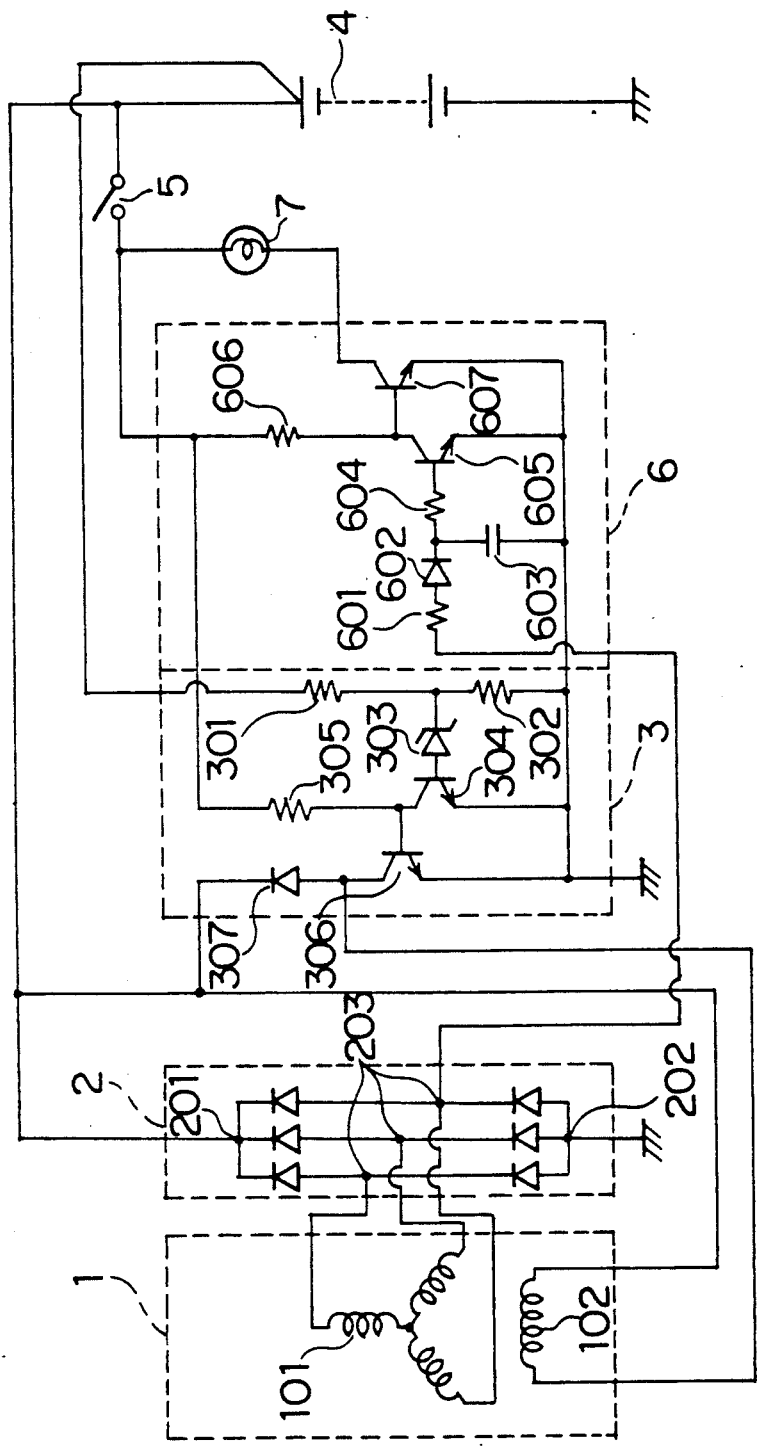
FIG. 3 is a view similar to FIG. 1, but showing a known control apparatus for an AC generator.

The operation of the voltage regulator 3 for controlling the output voltage of the generator 1 is the same as that of FIG. 3.

In this embodiment, by use of the emitter follower transistor 610, it is possible to employ a smoothing resistor 601 having such a large resistance that, even when any diode in the rectifier 2 deteriorates or fails for some reason, the resistor 601 can effectively prevent a sufficient leakage current from being supplied from the storage battery 4 through the failed rectifier 2 to the base of the transistor 610. As a result, the battery 4 is substantially prevented from discharging through the failed rectifier 2 and the detector 6A. In addition, due to the large resistance of the smoothing resistor 601, which serves to reduce the current supply to the base of the transistor 610, the capacitance of the smoothing capacitor 603 can be accordingly decreased, for example, to a value less than one tenth of that of the capacitor 603 of FIG. 3.

Figure 2:
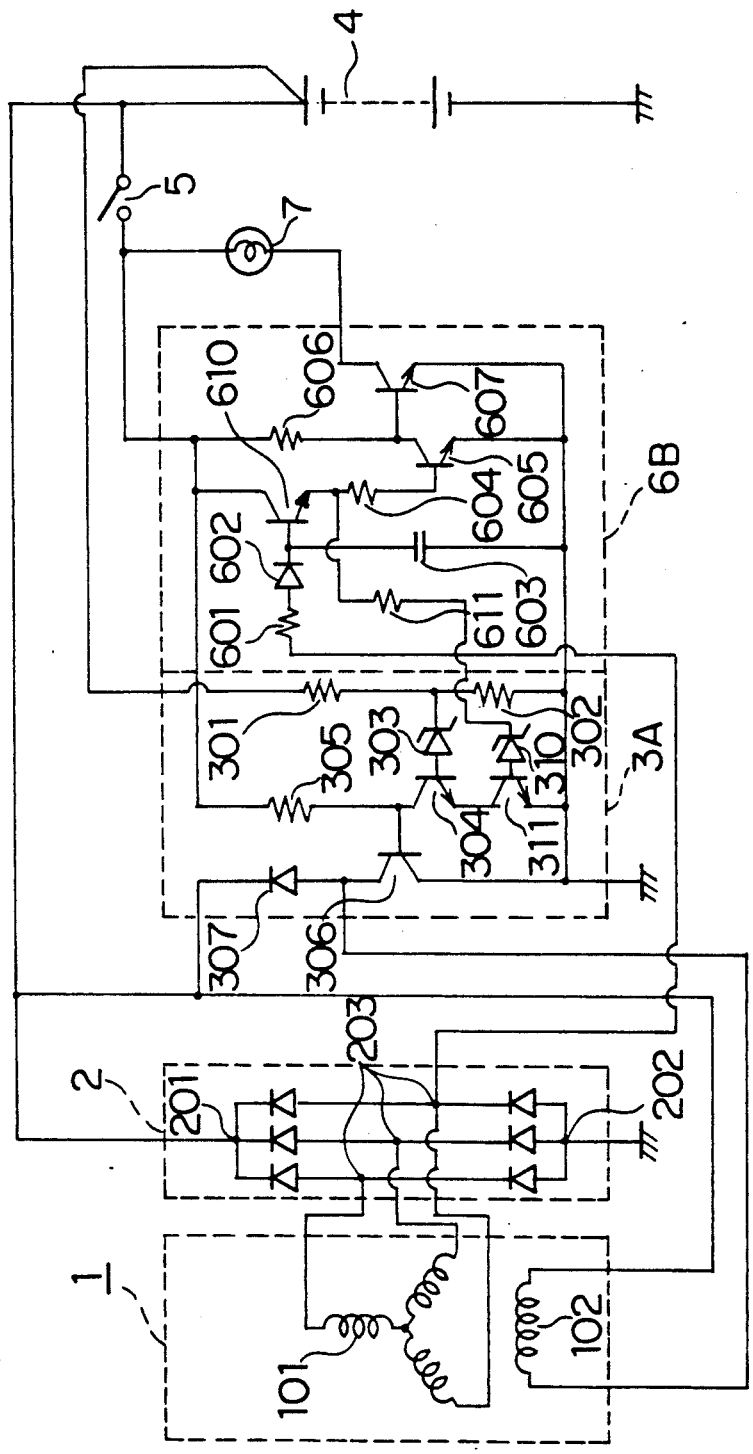
FIG. 2, is a view similar to FIG. 1, but showing another embodiment of the invention.

FIG. 2 illustrates another embodiment of the invention which is substantially similar to the previous embodiment of FIG. 1 except for the following features. Specifically, a power generation detector 6B includes, in addition to elements 601-607 and 610 which are the same as those of the detector 6A of FIG. 1, a resistor 611 for detecting the output voltage of the emitter follower transistor 610. A voltage regulator 3A includes, in addition to elements 301-307 which are the same as those of the voltage regulator 3 of FIG. 1, another Zener diode 310 and another control transistor 311. More specifically, the resistor 611 of the power generation detector 6A has one end thereof connected to the emitter of the control transistor 610 and the other end thereof connected to a cathode of the Zener diode 310 which has an anode connected to a base of the control transistor 311 of the voltage regulator 3A. The transistor 311 has a collector connected to the emitter of the control transistor 304, and an emitter connected to ground. The resistor 611, the Zener diode 310 and the transistor 311 together constitute an adjusting means for detecting the voltage of a generation signal from the generator 1 and adjusting the generator output at a second predetermined value which is lower than the first predetermined value to which the voltage regulator 3A regulates the output voltage of the generator 1.

In operation of this embodiment, the power generation detector 6B operates substantially in the same manner as that of the previous embodiment of FIG. 1. The voltage regulator 3A functions to not only regulate the output voltage of the generator 1 as in the voltage regulator 3 of the FIG. 1 embodiment, but to also perform the following operation. That is, when the storage battery 4 is fully charged by a continued operation of the generator 1 and held, for an extended period of time, at a voltage level which is higher than a first predetermined value to which the voltage regulator 3A regulates the output voltage of the generator 1 (this is called "a floating phenomenon" of the storage battery 4), the control transistor 304 is continuously conductive to hold the power transistor 306 non-conductive with the result that the generation signal from the generator 1 is going to fall or decrease. In this state, the resistor 611 and the Zener diode 310 cooperate to detect the output voltage of the emitter follower transistor 610. When the output voltage of the transistor 610 falls below a second predetermined value which is lower than the first predetermined value defined by the voltage regulator 3A, the Zener diode 310 becomes non-conductive, turning the control transistor 311 off. As a result, the other control transistor 304 is made non-conductive to turn the power transistor 306 on whereby the generation signal from the generator 1 again begins to increase. In this manner, in the event that there occurs a floating phenomenon of the storage battery 4, the generation signal from the generator 1 is adjusted to the second predetermined value, which is lower than the first predetermined value for normal operation of the battery 4, so as to prevent an excessive reduction in the voltage of the generation signal. This serves to prevent an incorrect indication or lighting of the indicator lamp 7.

Although in the above embodiment, the generation signal is taken out of an end of one of the coil elements of the armature coil 101, it can be taken out of the other end or neutral point thereof at which the coil elements are connected together.

As described in the foregoing, according to the present invention, with the provision of the emitter follower transistor 610 incorporated in the power generation detector 6A or 6B, the required capacitance of the smoothing capacitor 603 can be greatly reduced to a value less one tenth of that in the known control apparatus of FIG. 3. This serves to substantially reduce the manufacturing cost. Moreover, it is possible for the smoothing resistor 601 to have a large resistance sufficient to prevent leakage current flow through the rectifier 2 even if any of the diodes employed in the rectifier 2 deteriorate or fail, thus making it difficult for the storage battery 4 to discharge therethrough. In addition, with the further provision of an adjusting means comprising the resistor 611, the Zener diode 310 and the transistor 311 as in the second embodiment of FIG. 2, the generation signal from the generator 1 is easily and automatically adjusted to a proper level for preventing an incorrect indication of the indicator 7 when there develops a floating phenomenon of the storage battery 4.

What is claimed is:

1. A control apparatus for an AC generator (1) having a field coil (102) and an armature coil (101) which provides a generation signal during power generation of the generator, said control apparatus comprising:
   a rectifier (2) connected to the generator for rectifying the output voltage thereof;
   a storage battery (4) connected to the field coil of the generator for supplying a current to the field coil, said battery also being connected through said rectifier to the armature coil of the generator so as to be charged by the generator through said rectifier;
   a voltage regulator (3; 3A) connected between the generator and said battery for controlling the current supply from said battery to the field coil, said voltage regulator including a switch connected in series with the field coil of the generator for turning on and off the current supply from said storage battery to the field coil so as to control the output voltage of the generator to a predetermined value; and
   a detector (6A; 6B) connected between the armature coil of the generator and said storage battery and between said rectifier and said storage battery for detecting an operating state of the generator and operating an indicator (7) so as to indicate the detected operating state of the generator;
   said detector comprising means for preventing a significant battery leakage and discharge current flow through the detector upon the deterioration or failure of a rectifier diode, said preventing means comprising:
   an indicator switch (605, 607) for turning said indicator on and off;
   an emitter follower transistor (610) having an input terminal connected through a high impedance and the rectifier to the armature coil of the generator, and an output terminal connected to said indicator switch for controlling said indicator switch based on the generation signal from the armature coil; and
   a relatively low value capacitor (603) connected to said emitter follower transistor for smoothing the generation signal from the armature coil.

2. A control apparatus according to claim 1, wherein said indicator switch comprises a power transistor (607) which has a collector connected through said indicator to said storage battery, an emitter connected to ground and a base connected through a resistor (606) to said storage battery, and a control transistor (605) which has a collector connected to the base of said power transistor, an emitter connected to ground and a base connected through a resistor (604) to an emitter of said emitter follower transistor, said emitter follower transistor having a collector connected to said storage battery and a base connected through a reverse-current checking diode (602) and a resistor (601) to said rectifier.

3. A control apparatus according to claim 1, further comprising adjusting means connected between said voltage regulator and said detector for detecting the output voltage of said emitter follower transistor and adjusting it to a value lower than said predetermined value to which the output voltage of the generator is controlled by said voltage regulator.

4. A control apparatus according to claim 3, wherein said voltage regulator comprises a power transistor (306) which has a collector through the field coil of the generator to said storage battery, an emitter connected to ground and a base connected through a resistor (305) to said storage battery, a first control transistor (304) which has a collector connected to the base of said power transistor, an emitter and a base connected through a first Zener diode (303) to a voltage divider (301, 302) which is connected between said storage battery and ground, and a second control transistor (311) which has a collector connected to the emitter of said first control transistor, an emitter connected to ground and a base connected through a second Zener diode (310) and a resistor (611) to the emitter of said emitter follower transistor, said second Zener diode having a threshold voltage which is lower that of said first Zener diode.

* * * * *